(12) United States Patent
Burr et al.

(10) Patent No.: US 9,904,266 B2
(45) Date of Patent: Feb. 27, 2018

(54) REAL-TIME DEBUGGING SYSTEMS AND METHODS

(71) Applicant: General Electric Company, Schenectady, NY (US)

(72) Inventors: John Ronald Burr, Salem, VA (US); Richard William Shaw, Salem, VA (US); Christina Ann Romanik, Salem, VA (US); Muralidhar Venkata Subrahmanya Duvvuri, Hyderabad (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 967 days.

(21) Appl. No.: 13/870,679

(22) Filed: Apr. 25, 2013

(65) Prior Publication Data
US 2014/0324196 A1 Oct. 30, 2014

(51) Int. Cl.
*G05B 19/00* (2006.01)
*G05B 19/042* (2006.01)

(52) U.S. Cl.
CPC ........... *G05B 19/0428* (2013.01); *G05B 2219/24041* (2013.01); *G05B 2219/33148* (2013.01); *G05B 2219/33297* (2013.01); *G05B 2219/34256* (2013.01)

(58) Field of Classification Search
CPC ...... G05B 19/0428; G05B 2219/33297; G05B 2219/33148; G05B 2219/34256; G05B 2219/24041
USPC ...................................................... 700/26, 79
See application file for complete search history.

(56) References Cited

U.S. PATENT DOCUMENTS

| | | | |
|---|---|---|---|
| 5,862,054 A * | 1/1999 | Li | G05B 19/41875 700/108 |
| 8,055,727 B2 | 11/2011 | Cahill et al. | |
| 2007/0067725 A1* | 3/2007 | Cahill | G05B 23/027 715/733 |

(Continued)

FOREIGN PATENT DOCUMENTS

WO 2012103125 A1 8/2012

OTHER PUBLICATIONS

"OPC Security White Paper #1 "Understanding OPC and How it is deployed" prepared by: Digital Bond, British Columbia Institute of Technology, Byres Research, Jul. 27, 2007" (39 pages).

*Primary Examiner* — Christopher E Everett
(74) *Attorney, Agent, or Firm* — Eversheds Sutherland (US) LLP (57) ABSTRACT

Embodiments of the disclosure relate to real-time debugging systems and methods. In one embodiment, a system that includes a server module and a client module can be provided. The server module can be executable on a first computer and can be adapted to use a native communications format for interactive transfer of industrial automation data between the first computer and at least one industrial automation element. The client module, which can be executable on the same computer as the server module or on a different computer, can include a debugging application configured to use a universal communications format for communicatively interacting with the server module for accessing the industrial automation data and debugging one or more programming portions associated with the industrial automation data.

19 Claims, 4 Drawing Sheets

(56) References Cited

U.S. PATENT DOCUMENTS

| | | | |
|---|---|---|---|
| 2007/0168997 A1* | 7/2007 | Tran | G06F 11/3664 |
| | | | 717/129 |
| 2009/0210071 A1* | 8/2009 | Agrusa | G05B 23/0267 |
| | | | 700/9 |
| 2010/0161678 A1* | 6/2010 | Iyer | G06F 8/51 |
| | | | 707/802 |
| 2010/0306313 A1* | 12/2010 | Mahnke | G06F 9/543 |
| | | | 709/203 |
| 2011/0035792 A1* | 2/2011 | Leitner | G06F 21/41 |
| | | | 726/8 |

* cited by examiner

REAL-TIME DEBUGGING SYSTEMS AND METHODS

FIELD OF THE DISCLOSURE

This disclosure relates to debuggers, and more particularly, to real-time debugging systems and methods.

BACKGROUND OF THE DISCLOSURE

An industrial controller typically provides control and monitoring services on a continuous real-time basis and it is undesirable that such real-time services be stopped or interrupted. However, when a problem arises and it is desired to identify the cause of the problem, it is often disadvantageous to use a traditional debugger. One of the main disadvantages arises from the fact that many of these traditional debuggers operate by inserting breakpoints into one or more programs that are run on the industrial controller. As is known, the insertion of a breakpoint causes a program to halt upon encountering the breakpoint during execution of the program, thereby allowing for examination of various conditions that may indicate the cause of the problem. Unfortunately, the use of breakpoints to debug a problem in an industrial controller operation causes an undesirable stoppage in the operation of various components including the industrial controller.

The stoppage issue associated with breakpoints may be avoided by using other techniques such as for example, by using a print statement. In the print statement technique, a memory buffer is used to store information pertaining to conditions that are present when the print statement is encountered during execution of the program. The print statement technique does not halt program execution, thereby addressing this handicap associated with the breakpoint technique. However, the information stored by using the print statement technique merely provides snapshots of the real-time activity performed by the industrial controller and may not necessarily help to identify the cause of a problem that occurs at a different instant in time.

Consequently, in place of the breakpoint or print statement techniques, a custom application programming interface (API) may be used to examine real-time parameters for trouble-shooting purposes. Though helpful in addressing some of the issues associated with breakpoints and print statements, the custom API approach also suffers from some handicaps. These handicaps include development cost, purchase cost, and licensing cost. Furthermore, the proprietary nature of a custom API prevents easy modification or improvement of the API by non-owners (such as licensees) when such modifications or improvements are desired by the non-owners at minimal cost.

BRIEF DESCRIPTION OF THE DISCLOSURE

Embodiments of the disclosure can address some or all of the needs described above. Embodiments of the disclosure are directed generally to real-time debugging systems and methods.

According to one example embodiment of the disclosure, a system can include a server module and a client module. The server module is executable on a first computer and is adapted to use a native communications format for interactive transfer of industrial automation data between the first computer and at least one industrial automation element. The client module, which is executable on the same computer as the server module or on a different computer, can include a debugging application configured to use a universal communications format for communicatively interacting with the server module for accessing the industrial automation data and for debugging one or more programming portions associated with the industrial automation data.

According to another example embodiment of the disclosure, a method can include the execution of a server module on a first computer and using a native communications format for interactively transferring industrial automation data between the server module and at least one industrial automation element. The method can further include the execution of a client module on at least one of the first computer or a second computer. A universal communications format can be used for communicatively coupling the client module to the server module. The client module can include a debugging application for accessing the industrial automation data and for debugging one or more programming portions associated with the industrial automation data.

According to yet another example embodiment of the disclosure, a computer-readable storage medium can be provided. The computer-readable storage medium has stored thereon, instructions executable by a computer for performing operations that can include using a native communications format for interactively transferring industrial automation data between a server module and at least one industrial automation element; using a universal communications format for communicatively coupling the server module to a client module that includes a debugging application; and executing the debugging application to access the industrial automation data and debug one or more programming portions associated with the industrial automation data.

Other embodiments and aspects of the disclosure will become apparent from the following description taken in conjunction with the following drawings.

BRIEF DESCRIPTION OF THE DRAWINGS

Having thus described the disclosure in general terms, reference will now be made to the accompanying drawings, which are not necessarily drawn to scale, and wherein:

DETAILED DESCRIPTION OF THE DISCLOSURE

The disclosure now will be described more fully hereinafter with reference to the accompanying drawings, in which example embodiments of the disclosure are shown. This disclosure may, however, be embodied in many different forms and should not be construed as limited to the example embodiments set forth herein; rather, these embodiments are provided so that this disclosure will satisfy applicable legal requirements. Like numbers refer to like elements throughout.

Traditional debuggers typically incorporate various proprietary elements such as software, firmware, and communication formats. The proprietary nature of these elements can present several handicaps to end users. For example, these elements may not be readily modified by an end-user to suit individual application requirements, or modified to incorporate desirable enhancements that may not necessarily be in the interests of the owner of such proprietary elements.

In contrast, a standards-based approach can provide various benefits such as allowing cooperative interaction between various developers, users, products, and applications. For example, the Transmission Control Protocol/Internet Protocol (TCP/IP) standards can permit the Internet to operate relatively effectively using a wide variety of products designed and manufactured by various vendors.

Similarly, in the field of industrial automation, a standards-based approach that is generally known as Object Linking and Embedding (OLE) for Process Control (OPC) can be used for interfacing purposes, and is described in various publically available documents.

For example, "OPC Security White Paper #1 "Understanding OPC and How it is Deployed" prepared by: Digital Bond, British Columbia Institute of Technology, Byres Research, Jul. 27, 2007" provides some information on this subject and a few paragraphs from this document are reproduced below for convenience.

"OPC is used as a software interface technology for facilitating the transfer of data between industrial control systems, Human Machine Interfaces (HMI), supervisory systems and enterprise systems such as historical databases. It was developed in response to the need for a standardized method for allowing different control systems to interface with each other.

The primary value of OPC, which is administered by the OPC foundation, is that it provides a common interface for communicating with diverse industrial control products, regardless of the software or hardware used in the process. Before OPC, application developers had to develop specific communications drivers for each control system they wished to interface with. For example, HMI vendors had to develop hundreds of different drivers for the different Distributed Control Systems (DCS) and Programmable Logic Controllers (PLCs) on the market. Using OPC, these application vendors no longer need to develop separate drivers for each network or processor. Instead, they create a single optimized OPC client and/or server for their product. This OPC client would then communicate with OPC servers designed and sold by the manufacturers of the other networks and controllers.

OPC does not eliminate the need for drivers. Typically each manufacturer develops an OPC server for their specific product using whatever protocol their device needs, since they are best suited to build a server that will take full advantage of their product. However, once an OPC server exists for a piece of equipment or an application, it becomes much easier to integrate its data with other OPC compliant software.

OPC is based on Microsoft's Distributed Component Object Model (DCOM) technology, which is the culmination of a number of other technologies including Component Object Model (COM) and the Object Linking and Embedding (OLE). Many people have heard of OLE and have used its capabilities when adding a spreadsheet to a word processing document. OLE allows the spreadsheet application to dynamically update the information in the word processing document. Typically the user isn't required to do even the slightest configuration beyond the click of a mouse. The OLE specification defines how the spreadsheet (in this case the OLE server) will format and send data to the word processor document (the OLE client).

OPC is based on a client-server architecture. An OPC server is a software application that typically gathers information from devices (such as PLC, DCS or SCADA controllers) using these devices' native protocols (such as MODBUS or PROFIBUS). The server then provides access to this data via COM objects and method calls, allowing multiple OPC clients to indirectly read and write to the device via the OPC server.

An OPC client is an application that accesses data held by OPC servers. For example, an HMI package may contain an OPC client that allows it to access data provided by an OPC server application resident on another machine. The HMI package could also act as an OPC server, allowing other OPC clients to access the data it has aggregated either directly from a field controller or from other OPC servers."

In addition to the information reproduced above from "Understanding OPC and How it is Deployed," it should be understood that OPC is an evolving standard that has undergone several changes over the past years and is expected to continue changing as time goes by. The evolving versions have been identified in various ways. A few non-exhaustive examples include the OPC-DA standard, the OPC-AE standard, the OPC-HDA standard and the OPC-UA standard. The various embodiments described herein may incorporate any one or more of the original OPC standard or variants thereof. Such standards and variants are generally referred to herein as "universal communications formats" in accordance with their wide spread use as a standardized format for communications.

While OPC provides several benefits, especially in real-time applications, OPC has not been traditionally adapted for real-time debugging purposes. Consequently, in accordance with the disclosure, debugging systems that employ proprietary communication formats for implementing communications between server modules and client modules have been adapted to debug real-time OPC-based data interactions between diverse industrial control products. The proprietary communication formats are generally referred to herein as "native communications." It will be understood that the phrase "native communications" embraces a wide variety of formats, such as, for example, the serial port instrument communication format used in MATLAB (a product provided by MathWorks®), which includes a debugging API that can be used for various debugging purposes. However, the MATLAB debugger does not support debugging of content carried in various universal communications formats, and particularly, in the OPC communications format. Furthermore, if such content were provided to APIs such as the MATLAB debugger API, the APIs typically fail to provide security features that protect such content from being accessed by unauthorized entities.

Certain embodiments of the disclosure can relate to debugging systems and methods. In certain instances, embodiments of the disclosure can provide the technical solution of protecting against malicious attacks originated from outside a server and/or computer system. In other instances, embodiments of the disclosure can prevent or otherwise minimize exposure of relatively sensitive data outside a server and/or computer system.

Figure 1:
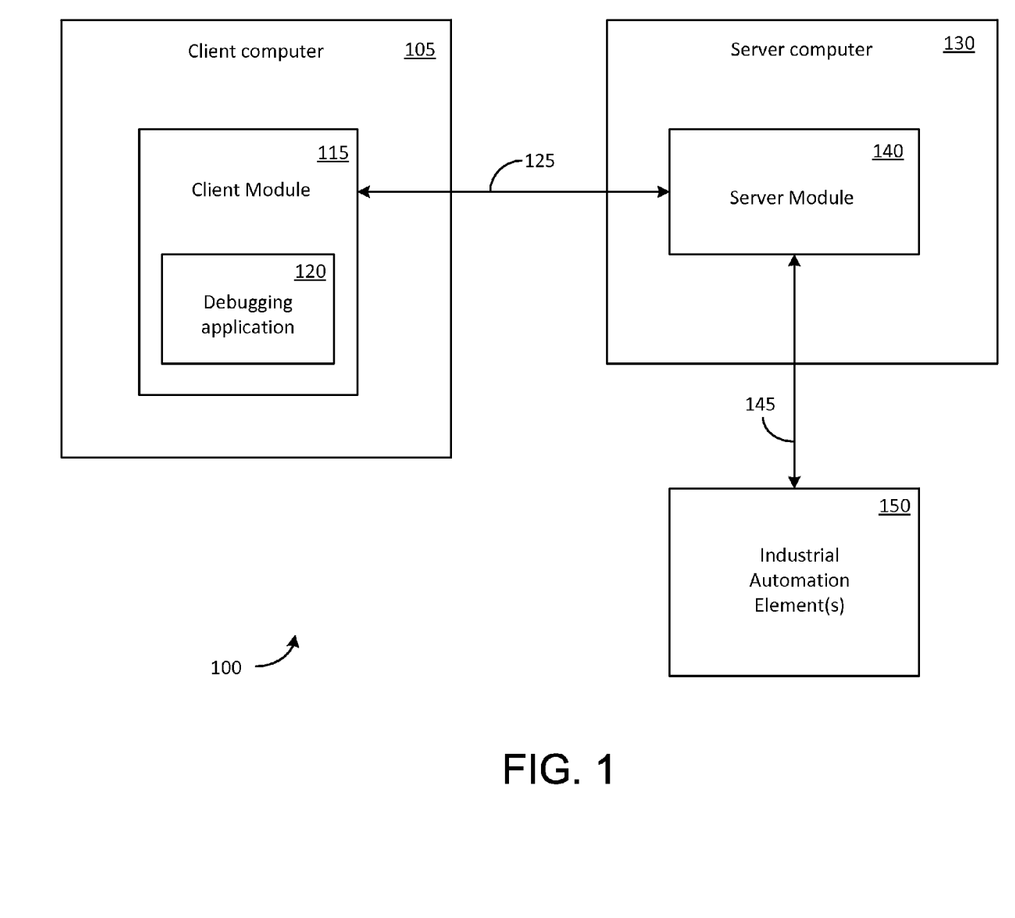
FIG. 1 illustrates an example functional block diagram representing a real-time debugging system according to one embodiment of the disclosure.

Having generally described some aspects of universal communications formats and native communications formats in the background, attention is now drawn to FIG. 1, which illustrates an example functional block diagram representing a real-time debugging system 100 according to one embodiment of the disclosure. Real-time debugging system 100 shown in FIG. 1 can include a client computer 105 and a server computer 130.

Server computer 130 can include a server module 140 that is communicatively coupled via a communication link 145 to one or more industrial automation element(s) 150 such as, for example, an industrial controller, a SCADA device, a DCS device, or a PLC device. Communication link 145 may be used to transfer various types of industrial data associated with a variety of industrial automation element(s) 150. This industrial data may be available and/or stored in various elements such as for example, industrial automation element(s) 150, server computer 130, and/or client computer 105. The programming content carried on communication link 145 may also be provided and/or stored in various elements such as for example, industrial automation element(s) 150, server computer 130, and/or client computer 105. When industrial automation element(s) 150 is a PLC device, for example, the programming content may be a program directed at executing operations, administration, maintenance, and provisioning (OAMP) processes upon the PLC device.

In this example embodiment, server module 140 can use the OPC-UA protocol or variants thereof to communicate with industrial automation element(s) 150. One example variant incorporates an OPC-UA protocol that is not layered in accordance with the OPC-UA standards of Hypertext Transfer Protocol (HTTP) or TCP/IP but is instead layered on named pipes. HTTP, TCP/IP and named pipes are known to persons of skill in the relevant art and will not be elaborated upon herein. This example variant makes the formatted content carried on communication link 145 available only to server computer 130, thereby providing confidentiality to this content, which may be sensitive in nature.

Client computer 105 can include a client module 115 that is communicatively coupled via a communication link 125 to server module 140. The communication protocol used on communication link 125 is typically a native communications format. For example, when client module 115 is implemented using MATLAB, the native communications format may be selected to transport a MATLAB program. More particularly, the MATLAB program may be a debugging program executed by debugging application 120 in order to debug some or all of a programming content carried on communication link 145 in an OPC-UA format, for example, between server computer 130 and industrial automation element(s) 150.

In one example implementation, the debugging of the programming content carried on communication link 145 between server computer 130 and industrial automation element(s) 150 may be carried out in real-time without interrupting the interactive transfer of industrial automation data between server computer 130 and industrial automation element(s) 150. However, in another example implementation, the interactive transfer of industrial automation data between server computer 130 and industrial automation element(s) 150 may be interrupted or stopped in order to debug the programming content. In yet another example implementation, a human operator may be provided with an option to carry out the debugging either without interrupting the interactive transfer of industrial automation data between server computer 130 and industrial automation element(s) 150 or by interrupting/stopping the interactive transfer.

The MATLAB debugging program may be compiled and linked with the OPC-UA stubs provided by the server module 140. As a result, internal variables may be exposed to various entities operating upon client computer 105 and/or server computer 130. This exposure may be controlled in several ways.

Before providing an explanation of such control, it will be understood that in an alternative embodiment to the one illustrated in FIG. 1, client module 115 may be incorporated inside server computer 130 rather than incorporated on a separate client computer 105 as shown. In this configuration, communication link 145 may employ a native communications format that is suitable for use inside server computer 130.

Turning now to the exposure control aspect, when client module 115 is incorporated inside server computer 130, server module 140 can be configured to allow debugging-related connections to originate exclusively from inside server computer 130 (in other words, only from client module 115 inside server computer 130). This configuration can protect against malicious attacks that may be originated from outside server computer 130.

In one example embodiment using TCP/IP, upon start-up, an indication may be provided that server module 140 will only accept connections from "localhost." When such an indication is provided, only client modules, such as client module 115 that is incorporated inside server computer 130 and is correspondingly configured to interact with server module 140, will be permitted to connect to server module 140 and client modules located external to server computer 130 will be ignored.

In some example embodiments, OPC-UA may be layered on top of TCP/IP, while in other example embodiments OPC-UA may be layered on top of named pipes instead of TCP/IP. In this latter configuration, the named pipes can only be used by processes running inside server computer 130 such as client module 115, which is incorporated inside server computer 130 and is suitably configured to interact with server module 140).

While integrating client module 115 inside server computer 130 can provide a certain level of protection against malicious attacks originated from outside server computer 130, a second protection mechanism may be used to protect against malicious connections originated from inside server computer 130, say from a malicious client module (not shown) inserted into server computer 130. In this second protection mechanism, which may be incorporated in a complementary manner to the protection provided against external attacks, server module 140 can prevent or otherwise minimize exposure of relatively sensitive data outside server computer 130, by using an authorization procedure to authenticate debugging-related connections originated from inside server computer 130 subsequent to an authentic connection being made between client module 115 and server module 140 using, for example, the "localhost" and/or the named pipes approach described above.

The authorization procedure may use a password protection scheme that permits authorized users to obtain access for debugging while denying other users such access. Furthermore, the authorization procedure may be used to provide various levels of access to various types of users, with some users granted access to more debugging-related features and material than others. For example, a first set of users may be allowed to edit or write debugging-related material while a second set of users may be allowed to see but not to change debugging-related material.

In contrast to the example embodiment described above, wherein client module 115 is incorporated inside server computer 130, in another example embodiment that is shown in FIG. 1, client module 115 can be incorporated into client computer 105 which is physically separate from server computer 130. In this embodiment, server computer 130 can recognize that client module 115 is not located inside server computer 130 and therefore can allow server module 140 to be accessed from outside server computer 130. An authorization procedure may be used here to ensure that only authorized users have access to debugging application 120 for interacting with server module 140. Here again, various levels of access may be provided to various types of users.

Figure 2:
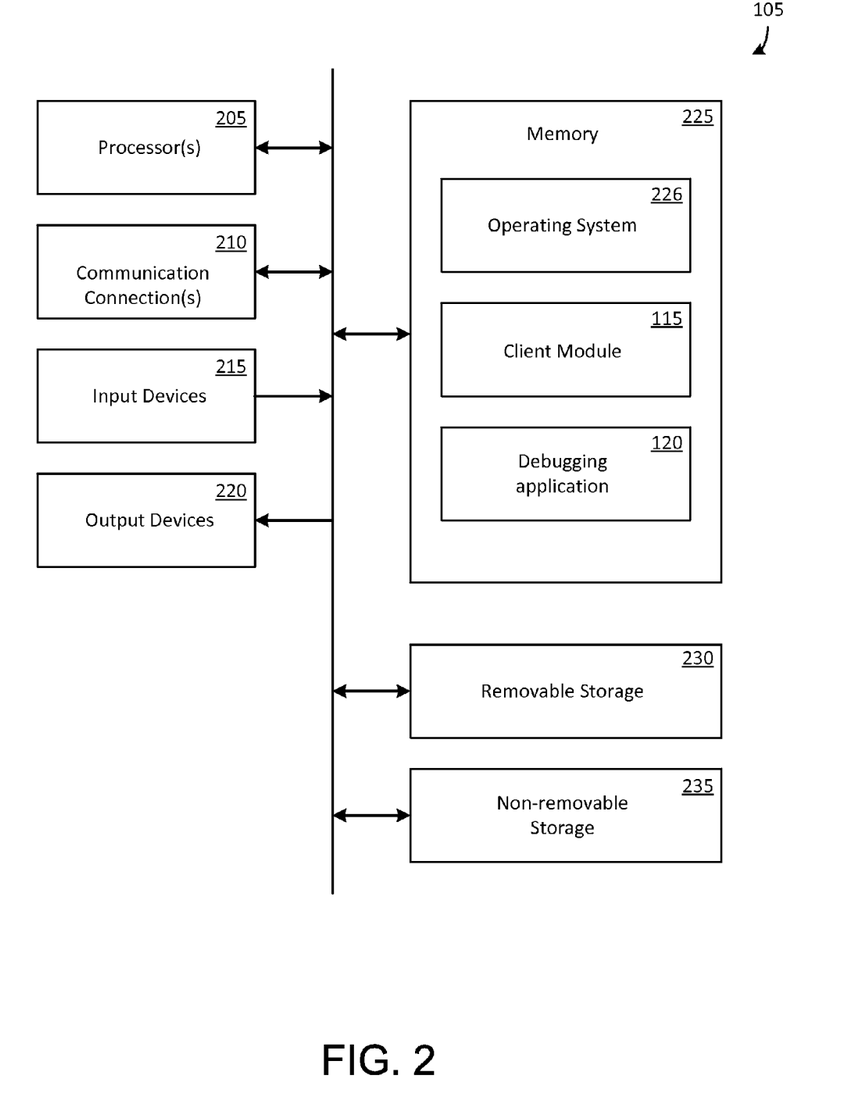
FIG. 2 illustrates an example client computer incorporating a processor for executing a client module functionality according to one embodiment of the disclosure.

Attention is now drawn to FIG. 2, which illustrates an example client computer 105 incorporating a processor 205 for executing client module 115 according to one embodiment of the disclosure. Client computer 105 may include a processor 205 capable of communicating with a memory 225. The processor 205 may be implemented and operated using appropriate hardware, software, firmware, or combinations thereof. Software or firmware implementations may include computer-executable or machine-executable instructions written in any suitable programming language to perform the various functions described. In one embodiment, instructions associated with a function block language may be stored in the memory 225 and executed by the processor 205.

A memory 225 may be used to store program instructions that are loadable and executable by the processor 205, as well as to store data generated during the execution of these programs. Depending on the configuration and type of client computer 105, memory 225 may be volatile (such as random access memory (RAM)) and/or non-volatile (such as read-only memory (ROM), flash memory, etc.). In some embodiments, the memory devices may also include additional removable storage 230 and/or non-removable storage 235 including, but not limited to, magnetic storage, optical disks, and/or tape storage. The disk drives and their associated computer-readable media may provide non-volatile storage of computer-readable instructions, data structures, program modules, and other data for the devices. In some implementations, memory 225 may include multiple different types of memory, such as static random access memory (SRAM), dynamic random access memory (DRAM), or ROM.

The memory 225, removable storage 230, and non-removable storage 235 are all examples of computer-readable storage media. For example, computer-readable storage media may include volatile and non-volatile, removable and non-removable media implemented in any method or technology for storage of information such as computer-readable instructions, data structures, program modules or other data. Additional types of computer storage media that may be present include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile discs (DVD) or other optical storage, magnetic cassettes, magnetic tapes, magnetic disk storage or other magnetic storage devices, or any other medium which can be used to store the desired information and which can be accessed by the devices. Combinations of any of the above should also be included within the scope of computer-readable media.

Client computer 105 may also include one or more communication connections 210 that may allow a control device (not shown) to communicate with devices or equipment capable of communicating with client computer 105. The connections can be established via various data communication channels or ports, such as USB or COM ports to receive cables connecting the control device to various other devices on a network. In one embodiment, the control device may include Ethernet drivers that enable the control device to communicate with other devices on the network. According to various embodiments, communication connections 210 may be established via a wired and/or wireless connection on the network.

The client computer 105 may also include one or more input devices 215, such as a keyboard, mouse, pen, voice input device, and touch input device. It may further include one or more output devices 220, such as a display, printer, and speakers.

In other embodiments, however, computer-readable communication media may include computer-readable instructions, program modules, or other data transmitted within a data signal, such as a carrier wave, or other transmission. As used herein, however, computer-readable storage media do not include computer-readable communication media.

Turning to the contents of the memory 225, the memory 225 may include, but is not limited to, an operating system (OS) 226 and one or more application programs or services for implementing the features and aspects disclosed herein. Such applications or services may include a client module 115 and a debugging application 120. In one embodiment, client module 115 and debugging application 120 may be implemented by software that is provided in configurable control block language and is stored in non-volatile memory. When executed by processor 305, client module 115 and debugging application 120 implement the various functionalities and features described in this disclosure.

Figure 3:
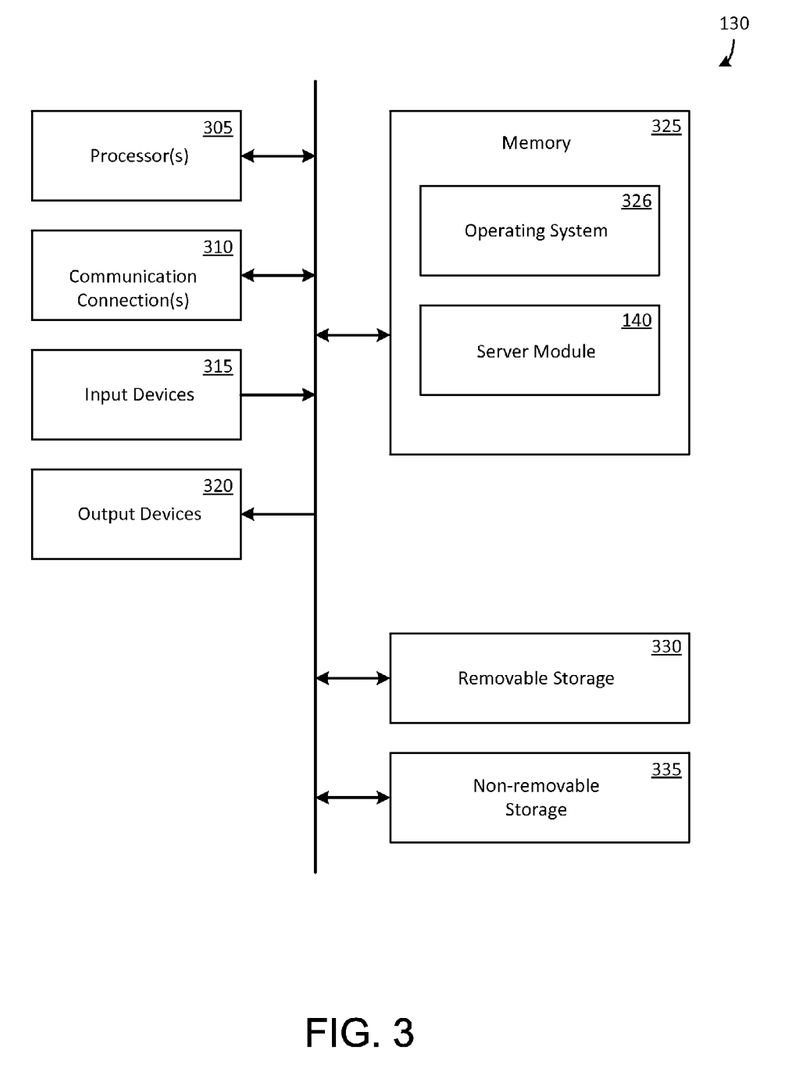
FIG. 3 illustrates an example server computer incorporating a processor for executing a server module functionality according to one embodiment of the disclosure.

FIG. 3 illustrates an example server computer 130 incorporating a processor 305 for executing server module 140 according to one embodiment of the disclosure. The nature and functionality of the various elements contained in server computer 130 can be understood from the description provided above for client computer 105, with the primary difference being the inclusion of server module 140 inside memory 325. When executed by processor 305, server module 140 can implement the various functionalities and features described in this disclosure.

In another example embodiment wherein client module 115 is incorporated into server computer 130 as described above, server module 140, client module 115 and debugging application 120 may be all co-located inside memory 325.

Figure 4:
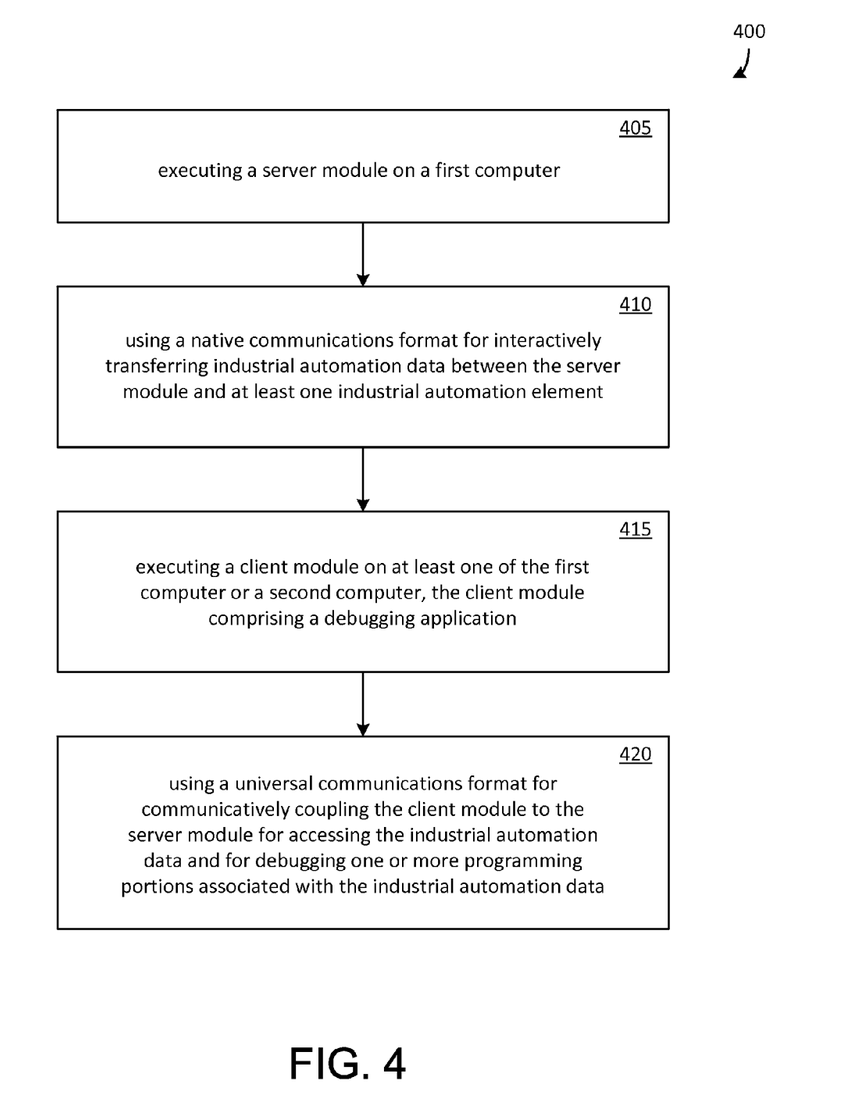
FIG. 4 illustrates an example flowchart of a method for real-time debugging according to one embodiment of the disclosure.

FIG. 4 illustrates an example flowchart 400 of a method for real-time debugging according to one embodiment of the disclosure. In block 405, a server module can be executed on a first computer (server module 140 executed by processor 305, for example). In block 410, a native communications format is used for interactively transferring industrial automation data between the server module (server module 140, for example) and at least one industrial automation element such as industrial automation element(s) 150. In block 415, a client module (client module 115, for example) can be executed on a computer (server computer 130, for example) that includes a server module (server module 140, for example) or on a separate computer (client computer 105, for example). This client module may include a debugging application (debugging application 120, for example). In block 420, a universal communications format can be used to communicatively couple the client module to the server module for accessing the industrial automation data and for debugging one or more programming portions associated with the industrial automation data.

References are made herein to block diagrams of systems, methods, apparatuses, and computer program products according to example embodiments of the disclosure. It will be understood that at least some of the blocks of the block diagrams, and combinations of blocks in the block diagrams, respectively, may be implemented at least partially by computer program instructions. These computer program instructions may be loaded onto a general purpose computer, special purpose computer, special purpose hardware-based computer, or other programmable data processing apparatus to produce a machine, such that the instructions which execute on the computer or other programmable data processing apparatus create means for implementing the functionality of at least some of the blocks of the block diagrams, or combinations of blocks in the block diagrams discussed.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the block or blocks. The computer program instructions may also be loaded onto a computer or other programmable data processing apparatus to cause a series of operational elements to be performed on the computer or other programmable apparatus to produce a computer implemented process such that the instructions that execute on the computer or other programmable apparatus provide elements for implementing the functions specified in the block or blocks.

One or more components of the systems and one or more elements of the methods described herein may be implemented through an application program running on an operating system of a computer. They also may be practiced with other computer system configurations, including hand-held devices, multiprocessor systems, microprocessor based, or programmable consumer electronics, mini-computers, mainframe computers, etc.

Application programs that are components of the systems and methods described herein may include routines, programs, components, data structures, etc. that implement certain abstract data types and perform certain tasks or actions. In a distributed computing environment, the application program (in whole or in part) may be located in local memory, or in other storage. In addition, or in the alternative, the application program (in whole or in part) may be located in remote memory or in storage to allow for circumstances where tasks are performed by remote processing devices linked through a communications network.

Many modifications and other embodiments of the example descriptions set forth herein to which these descriptions pertain will come to mind having the benefit of the teachings presented in the foregoing descriptions and the associated drawings. Thus, it will be appreciated the disclosure may be embodied in many forms and should not be limited to the example embodiments described above. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. A system comprising:
a client module configured to use a proprietary communications format when communicatively interacting with a server module for debugging one or more programming portions of industrial automation data transferred interactively between the server module and at least one industrial automation element, wherein the debugging comprises eliminating the usage of a breakpoint and is executed in real-time, thereby allowing interactive transfer of industrial automation data between the server module and the at least one industrial automation element without interruption.

2. The system of claim 1, wherein the industrial automation data comprises at least one of supervisory, control and data acquisition (SCADA) data, distributed control systems (DCS) data, or programmable logic controller (PLC) data.

3. The system of claim 2, wherein the industrial automation data is transferred interactively between the server module and the at least one industrial automation element by using a standards-based communications format that is compliant with at least one interoperability standard for industrial automation and related domains.

4. The system of claim 3, wherein the standards-based communications format comprises one of an OPC-DA standard, an OPC-AE standard, an OPC-HDA standard, or an OPC-UA standard.

5. The system of claim 1, wherein each of the client module and the server module is located in a computer that is configured to prevent exposure of the industrial automation data outside the computer.

6. The system of claim 5, wherein the server module is configured to expose the industrial automation data to the client module, inside the computer only upon fulfillment of an authorization procedure.

7. The system of claim 1, wherein the client module and the server module are co-located in a computer, and wherein the client module executes the debugging of the one or more programming portions of the industrial automation data by using a debugging program compiled and linked using one or more stubs provided by the server module.

8. A method comprising:
using a proprietary communications format for communicatively coupling a client computer to a server computer; and
using a debugging application in the client computer to debug one or more programming portions of industrial automation data that is transferred between the server computer and at least one industrial automation element, wherein the debugging application comprises eliminating the usage of a breakpoint and is executed in real-time, thereby allowing interactive transfer of industrial automation data between the server computer and the at least one industrial automation element without interruption.

9. The method of claim 8, wherein the industrial automation data comprises at least one of supervisory, control and data acquisition (SCADA) data, distributed control systems (DCS) data, or programmable logic controller (PLC) data.

10. The method of claim 9, wherein the industrial automation data is transferred interactively between the server computer and the at least one industrial automation element by using a standards-based communications format that is compliant with at least one interoperability standard for industrial automation and related domains, provided by the OPC Foundation.

11. The method of claim 10, wherein the standards-based communications format comprises one of an OPC-DA standard, an OPC-AE standard, an OPC-HDA standard, or an OPC-UA standard.

12. The method of claim 8, further comprising:
preventing exposure of the industrial automation data outside the client computer.

13. The method of claim 8, further comprising:
executing an authorization procedure; and
providing the industrial automation data to the client computer subject to fulfillment of the authorization procedure.

14. A non-transitory computer-readable storage medium having stored instructions executable by a computer for performing operations comprising:
using a standards-based communications format for interactively transferring industrial automation data between a server module and at least one industrial automation element;
using a proprietary communications format for communicatively coupling the server module to a client module, the client module comprising a debugging application that includes eliminating the usage of a breakpoint; and
executing the debugging application to debug one or more programming portions associated with the industrial automation data in real-time, thereby allowing interactive transfer of industrial automation data between the server module and the at least one industrial automation element without interruption.

15. The non-transitory computer-readable storage medium of claim 14, wherein the industrial automation data comprises at least one of supervisory, control and data acquisition (SCADA) data, distributed control systems (DCS) data, or programmable logic controller (PLC) data.

16. The non-transitory computer-readable storage medium of claim 15, wherein the standards-based communications format is compliant with at least one interoperability standard for industrial automation and related domains, provided by the OPC Foundation.

17. The non-transitory computer-readable storage medium of claim 15, wherein the standards-based communications format comprises one of an OPC-DA standard, an OPC-AE standard, an OPC-HDA standard, or an OPC-UA standard.

18. The non-transitory computer-readable storage medium of claim 14, further including instructions for:
executing an authorization procedure; and
providing the industrial automation data to the client module subject to fulfillment of the authorization procedure.

19. The non-transitory computer-readable storage medium of claim 14, wherein the debugging application is compiled and linked by using one or more stubs provided by the server module.

* * * * *